Patented July 21, 1942

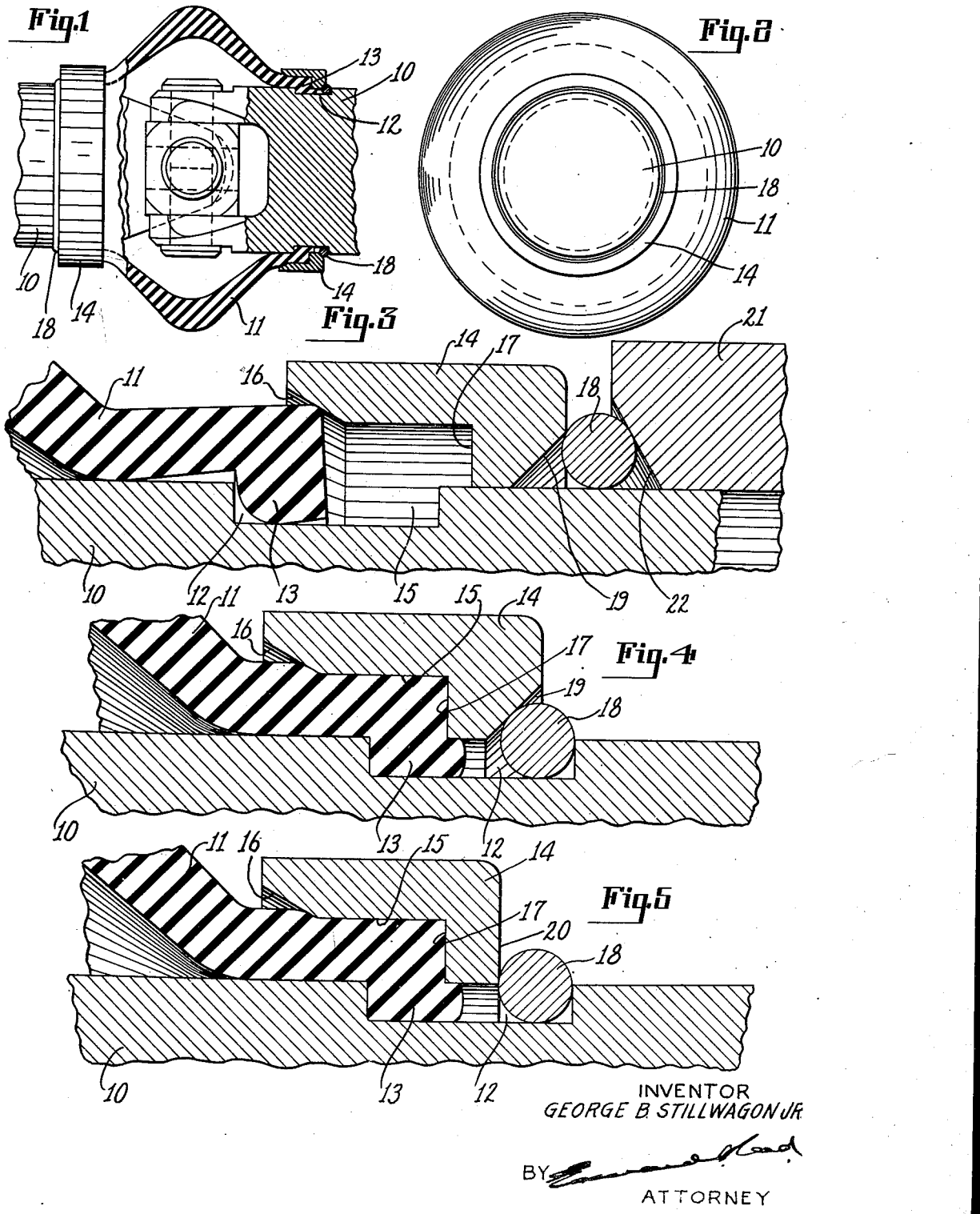

2,290,776

UNITED STATES PATENT OFFICE 2,290,776

ATTACHING DEVICE

George B. Stillwagon, Jr., Dayton, Ohio, assignor of one-half to Kenneth G. Fraser, Dayton, Ohio Application September 2, 1941, Serial No. 409,162

15 Claims. (Cl. 64—32)

This invention relates to an attaching device and is designed more particularly for positively securing a tubular element of yieldable material to a supporting structure. Such a device is especially useful in connection with rubber covers for universal joints such as are shown in the application of Stillwagon and Fraser, Serial No. 331,170, filed April 23, 1940. A cover of the kind there shown must be firmly anchored to the joint to prevent slippage when the joint is flexed and the connection must be sufficiently tight to prevent the seepage of oil, as the cover is intended to contain a lubricant. Further, the cover of the aforesaid application is under longitudinal tension to hold the pivot elements in firm contact one with the other and any slippage of the cover would reduce or destroy that tension. The attaching means shown in said application is satisfactory under many conditions of operation but it has been found to be inadequate to withstand the stresses to which the cover is subjected in some installations.

One object of the invention is to provide an attaching device which under all conditions of operation will positively prevent all movement of the attached end of the tubular element with relation to the supporting structure, and will form a leak-proof connection between the tubular element and the supporting structure.

A further object of the invention is to provide such a device which can be easily applied and locked in attaching position, but is difficult to remove and cannot be easily tampered with.

A further object of the invention is to provide such a device which will be small and compact in form and free from projecting parts.

A further object of the invention is to provide such a device which will be simple in construction and can be produced at low cost.

Other objects of the invention may appear as the device is described in detail.

In the accompanying drawing Fig. 1 is a longitudinal sectional view, partly in elevation, of a universal joint having a cover attached thereto in accordance with my invention; Fig. 2 is an end elevation of such a joint; Fig. 3 is a fractional sectional view on an exaggerated scale, showing the device supported on a universal joint prior to being moved to attaching position; Fig. 4 is a similar view showing the attaching device in attaching position; and Fig. 5 is a view similar to Fig. 4 showing a modified form of the attaching device.

In the drawing I have illustrated the preferred form of the invention, together with a minor modification thereof, and have shown the same as applied to the cover of a universal joint, but it will be understood that the attaching device may take various forms and may be applied to various elements without departing from the spirit of the invention.

In the illustrated embodiment of the invention the attaching device is applied to a universal joint of a well known construction which comprises two coupling members 10 pivotally connected one to the other for relative movement about intersecting axes. The pivot elements of the joint are enclosed by a cover 11 comprising a tubular element of yieldable material, the end portions of which fit snugly about the body portions of the respective coupling members. The body portion or barrel of each coupling member constitutes a supporting structure for the end of the tubular element and is provided with a circumferential recess or shallow groove 12. This supporting structure is here shown as cylindrical in shape but it may be of any suitable cross sectional shape. The tubular element is provided at each end, or at the end which is to be attached to a supporting structure, with an internal circumferential projection or bead 13 adapted to enter the groove 12 in the supporting structure. This bead may be of any suitable size and shape and the term "bead" as herein used is intended to include any projection adapted to enter the groove and to be secured therein substantially in the manner hereinafter described. In the present instance the bead is of an axial width substantially less than the width of the groove. The tubular element may be formed of any suitable material but is preferably formed of resilient material, such as synthetic rubber, and I prefer that the beaded end thereof shall be of an internal diameter somewhat less than the diameter of the supporting structure so that when stretched over the supporting structure the bead will be retained firmly in the groove prior to and during the application of the attaching device thereto.

For the purpose of positively locking the tubular element to the supporting structure and forming a leak-proof joint between the tubular element and the supporting structure I have provided an attaching device of such a character that when applied to the beaded end of the tubular element it will deform the same and press the inner surfaces thereof into tight contact with the opposed surfaces of said supporting structure so as to produce a leak-proof joint and positively prevent any slippage of said end of said tubular element with relation to said supporting structure, said attaching device being locked against movement with relation to the supporting structure, due to the tendency of said end of said tubular element to return to its initial form, or otherwise.

The attaching device is here shown as comprising an annular member or collar 14 extending about the supporting structure and having a part to overlie the beaded end of said tubular member, when the bead is in the groove, said part being spaced from the base of the groove a distance less than the initial or undeformed thickness of said beaded end. Said annular member also has a second part to engage the transverse surface of said beaded end and press the bead against the adjacent side wall of the groove, said second part being so arranged that when in operative engagement with said beaded end it will be spaced from said side wall a distance less than the initial axial width of said bead. Preferably the annular member comprises a single piece of hard rigid material, such as metal, and has its axial bore of varying diameters to provide the parts which engage the beaded end of the tubular element. Adjacent the outer end of the annular member, that is the end farthest removed from the tubular element, the diameter of the bore corresponds substantially to the diameter of the outer portion of the supporting structure so that the annular member may be slidably mounted on that structure. The inner portion of the bore is enlarged to provide a cavity 15 to receive the beaded end of the tubular element, and the inner end of this enlarged portion is flared outwardly at 16. The cavity 15 is of such diameter that the circumferential wall thereof is spaced from the base of the groove 12 a distance less than the initial thickness of the beaded end of the tubular element, and the inner end of the flared portion 16 is of a diameter greater than said initial thickness of said beaded end. The enlargement of the bore provides the outer portion of the annular member with an inner transverse surface 17 adapted to engage the transverse surface of the beaded end of the tubular member.

In applying the attaching device the tubular element is placed over the inner portion of the supporting structure with the bead 13 in the groove 12. The annular member 14 is placed on the outer portion of the supporting structure and pushed inwardly to cause the flared end 16 thereof to engage the beaded end of the tubular element and press the same against the supporting structure, thereby deforming said beaded end and so reducing the diameter thereof that it can enter the cavity 15 as the annular member continues to move inwardly. The length of the cavity 15 is such that when the annular member is in its final or operative position the inner end of the circumferential wall of the cavity will extend somewhat beyond the groove 12. As the annular member continues to move inwardly the part 17 thereof will engage the inner surface of the tubular member and press the bead against the inner side wall of the groove and further deform the same. Some of the material displaced by the deformation of the beaded end of the tubular element will enter and fill the inner corner of the groove, some of it may be forced outwardly beneath the outer portion of the annular member, which then extends about the outer portion of the groove, and some of it may be forced inwardly ahead of the flared end of the annular member.

The annular member is positively retained in its operative position against any outward force which may be exerted thereon, either by the tendency of the deformed material to resume its initial shape and position or otherwise. Any suitable retaining means may be provided for this purpose but preferably the annular member or collar is of such length that when in its operative position the outer end thereof will be spaced inwardly beyond the outer side wall of the groove, and the outward movement of the annular member may be prevented or positively limited by inserting a retaining device between the outer end thereof and the outer side wall of the groove. I prefer to employ for this purpose a snap ring 18 having an initial diameter less than the diameter of the supporting structure. The snap ring is expanded and placed about the supporting structure adjacent the outer end of the annular member and when the latter has been moved inwardly beyond the outer side wall of the groove the snap ring is moved over the groove and permitted to contract into the latter. It is thus placed between the annular member and the wall of the groove and it is of such thickness that it will lock the annular member against outward movement. If desired, the outer end of the annular member may be undercut, as shown at 19 in Figs. 3 and 4, to provide the same with a part which will partially overhang the retaining ring and render its displacement or removal difficult. However, very satisfactory results have been attained with the arrangement shown in Fig. 5, where the retaining ring is confined between the flat end wall 20 and the side wall of the groove. With either arrangement the annular member will usually have a slight outward movement after the retaining ring has snapped into the groove and the inward pressure on the annular member has been withdrawn, but this movement is not sufficient to materially affect the sealing contact of the annular member with the tubular element or the locking of the tubular element, and the retaining ring prevents further outward movement.

To facilitate the application of the attaching device I have provided a positioning implement, such as a sleeve 21, adapted to be slidably supported on the supporting structure outwardly beyond the snap ring, as shown in Fig. 3. When forced inwardly the sleeve engages the snap ring and presses both the ring and the annular member inwardly to their operative positions. If desired, the inner end of the sleeve may be undercut, as shown, to exert radial as well as axial pressure on the snap ring. The sleeve is of course removed after the snap ring has entered the groove.

While I have shown and described the preferred embodiment of my invention, together with a minor modification thereof, I wish it to be understood that I do not desire to be limited to the details thereof as various modifications may occur to a person skilled in the art.

Having now fully described my invention, what I claim as new and desire to secure by Letters Patent, is:

1. A device for securing to a supporting structure a tubular element of yieldable material mounted about the same and having at one end thereof an internal bead, said structure having a circumferential shoulder facing said bead, said device comprising an annular member adapted to be placed about said supporting structure and moved toward said shoulder, said annular member having means operative when said member is so moved to deform the beaded end of said element and clamp the latter between said annular member and said shoulder, and means to retain said annular member in clamping engagement with said element.

2. A device for securing to a supporting structure having a circumferential shoulder a tubular element one end of which extends beyond said shoulder and is provided with an internal bead, said device comprising a rigid annular member movable lengthwise of said supporting member into engagement with the beaded end of said tubular element, said annular member being shaped to press said beaded end of said element against said shoulder, to deform the same and to hold said deformed end of said element against both radial and axial movement with relation to said supporting structure, and means for positively retaining said annular member in said element deforming position.

3. A device for securing to a supporting structure having between and spaced from the ends thereof a circumferential shoulder a tubular element one end of which extends beyond said shoulder and is provided with an internal bead, said device comprising a rigid annular member adapted to be supported on said supporting structure beyond the beaded end of said element for movement into engagement with said beaded end, said annular member having parts opposed to and cooperating with said shoulder and an adjacent portion of said supporting structure to grip and deform said beaded end of said element, and means for securing said annular member in deforming engagement with said element.

4. A device for securing to a supporting structure having a circumferential groove a tubular element of yieldable material having at one end a bead extending into said groove, said device comprising a member to extend about said supporting structure and having a part to engage the circumferential surface of the beaded end of said tubular element and press the bead into said groove, said part being spaced from the base of said groove a distance less than the initial thickness of said beaded end of said element, said member also having a part to engage the transverse surface of said end of said element and press said bead against one side wall of said groove, and means for retaining said member in a position in which the last mentioned part thereof is spaced from said wall of said groove a distance less than the initial axial width of said bead.

5. A device for securing to a supporting structure having a circumferential groove a tubular element of yieldable material having at one end a bead extending into said groove, said device comprising a member to extend about said supporting structure and having a part to engage the circumferential surface of the beaded end of said tubular element and press the bead into said groove, said part being spaced from the base of said groove a distance less than the initial thickness of said beaded end of said element, said member also having a part to engage the transverse surface of said end of said element and press said bead against one side wall of said groove, and a retaining element inserted between said member and the other wall of said groove to hold said member in a position in which the last mentioned part thereof is spaced from the first mentioned side wall of said groove a distance less than the initial axial width of said bead.

6. A device for positively connecting with a coupling member of a universal joint having a circumferential groove a tubular cover of resilient material having at one end an internal bead extending into said groove, said device comprising a collar having a part to extend about the beaded end of said cover, said part having its inner surface spaced from the base of said groove a distance less than the initial thickness of said beaded end of said cover and having a second part extending at an angle to the first mentioned part to engage the transverse surface of the beaded end of said cover and press said bead against one side wall of said groove, said second part being so arranged that when said collar is in its operative position said second part will be spaced from said side wall a distance less than the initial axial width of said bead, and means to lock said collar in said operative position.

7. A device for positively connecting with a coupling member of a universal joint having a circumferential groove a tubular cover of resilient material having at one end an internal bead extending into said groove, said device comprising a collar having a part to extend about the beaded end of said cover, said part having its inner surface spaced from the base of said groove a distance less than the initial thickness of said beaded end of said cover and having a second part extending at an angle to the first mentioned part to engage the transverse surface of the beaded end of said cover and press said bead against one side wall of said groove, said second part being so arranged that when said collar is in its operative position said second part will be spaced from said side wall a distance less than the initial axial width of said bead, and a locking device interposed between the other side wall of said groove and said collar to prevent the movement of said collar toward the last mentioned side wall.

8. A device for positively connecting with a coupling member of a universal joint having a circumferential groove a tubular cover of resilient material having at one end an internal bead extending into said groove, said device comprising a collar having a part to extend about the beaded end of said cover, said part having its inner surface spaced from the base of said groove a distance less than the initial thickness of said beaded end of said cover and having a second part extending at an angle to the first mentioned part to engage the transverse surface of the beaded end of said cover and press said bead against one side wall of said groove, said second part being so arranged that when said collar is in its operative position said second part will be spaced from said side wall a distance less than the initial axial width of said bead, said groove being of a width substantially greater than the width of said bead, and a snap ring to be inserted in said groove between said collar and the other side wall of said groove.

9. A device for positively connecting with a coupling member of a universal joint having a circumferential groove a tubular cover of resilient material having at one end an internal bead extending into said groove, said device comprising a collar having a part to extend about the beaded end of said cover, said part having its inner surface spaced from the base of said groove a distance less than the initial thickness of said beaded end of said cover and having a second part extending at an angle to the first mentioned part to engage the transverse surface of the beaded end of said cover and press said bead against one side wall of said groove, said second part being so arranged that when said collar is in its operative position said second part will be spaced from said side wall a distance less than the initial axial width of said bead, said groove being of a width substantially greater than the width of said bead, and a snap ring to be inserted in said groove between said collar and the other side wall of said groove, said collar having that end thereof adjacent to the last mentioned wall undercut to receive at least a portion of said snap ring.

10. A device for positively connecting with a coupling member of a universal joint having a circumferential groove a tubular cover of resilient material having at one end an internal bead extending into said groove, said device comprising an annular member adapted to be slidably mounted on said coupling member for inward movement toward said cover and having the inner portion of its longitudinal bore enlarged to form a cavity extending about said coupling member, the inner end of said cavity being flared outwardly, said cavity being of such dimensions with relation to the beaded end of said cover that when said annular member is pushed inwardly over said beaded end the latter will be pressed toward said coupling member and deformed and said bead will be pressed against the inner side wall of said groove and further deformed, and means to positively limit the outward movement of said annular member.

11. A device for positively connecting with a coupling member of a universal joint having a circumferential groove a tubular cover of resilient material having at one end an internal bead extending into said groove, said device comprising an annular member adapted to be slidably mounted on said coupling member for inward movement toward said cover and having the inner portion of its longitudinal bore enlarged to form a cavity extending about said coupling member, the inner end of said cavity being flared, said cavity being of such dimensions with relation to the beaded end of said cover that when said annular member is pushed inwardly over said beaded end the latter will be pressed toward said coupling member and deformed and said bead will be pressed against the inner side wall of said groove and further deformed, and a retaining element to engage the outer portion of said annular member and limit the outward movement of the latter due to the tendency of said resilient material to resume its initial form.

12. A device for positively connecting with a coupling member of a universal joint having a circumferential groove a tubular cover of resilient material having at one end an internal bead extending into said groove, said device comprising an annular member adapted to be slidably mounted on said coupling member for inward movement toward said cover and having the inner portion of its longitudinal bore enlarged to form a cavity extending about said coupling member, the inner end of said cavity being flared, said cavity being of such dimensions with relation to the beaded end of said cover that when said annular member is pushed inwardly over said beaded end the latter will be pressed toward said coupling member and deformed and said bead will be pressed against the inner side wall of said groove and further deformed, and a retaining element to be inserted in said groove to retain said annular element in a position to maintain said beaded end of said cover in its deformed condition.

13. A device for positively connecting with a coupling member of a universal joint having a circumferential groove a tubular cover of resilient material having at one end an internal bead extending into said groove, said device comprising an annular member adapted to be slidably mounted on said coupling member for inward movement toward said cover and having the inner portion of its longitudinal bore enlarged to form a cavity extending about said coupling member, the inner end of said cavity being flared, said cavity being of such dimensions with relation to the beaded end of said cover that when said annular member is pushed inwardly over said beaded end the latter will be pressed toward said coupling member and deformed and said bead will be pressed against the inner side wall of said groove and further deformed, a snap ring to be placed about said coupling member on the outer side of said annular member, and a positioning element to be movably mounted on said coupling member to push said annular member over the beaded end of said cover and to push said snap ring into said groove.

14. A device for positively connecting with a coupling member of a universal joint having a circumferential groove a tubular cover of resilient material having at one end an internal bead extending into said groove, said device comprising an annular member adapted to be slidably mounted on said coupling member for inward movement toward said cover and having the inner portion of its longitudinal bore enlarged to form a cavity extending about said coupling member, the inner end of said cavity being flared and said cavity being of such radial width with relation to the beaded end of said cover that when said annular member is pushed inwardly over said beaded end the latter will be pressed toward said coupling member and deformed, and means to retain said annular member in said element deforming position.

15. A device for positively connecting with a coupling member of a universal joint having a circumferential groove a tubular cover of resilient material having at one end an internal bead extending into said groove, said device comprising an annular member adapted to be slidably mounted on said coupling member for inward movement toward said cover and having an inner portion adapted to extend about said beaded end of said cover and having a transverse portion spaced outwardly from the inner end thereof to engage the beaded end of said cover and press said bead against the inner side wall of said groove to deform said bead, and means for retaining said annular member in said bead deforming position.

GEORGE B. STILLWAGON, Jr.